United States Patent
Fransson et al.

(10) Patent No.: US 8,646,433 B2
(45) Date of Patent: Feb. 11, 2014

(54) ARRANGEMENT FOR EXHAUST BRAKING OF A COMBUSTION ENGINE

(75) Inventors: Håkan Fransson, Björnlunda (SE); Roger Olsson, Hägersten (SE)

(73) Assignee: Scania CV AB (SE)

( * ) Notice: Subject to any disclaimer, the term of this patent is extended or adjusted under 35 U.S.C. 154(b) by 833 days.

(21) Appl. No.: 12/865,146

(22) PCT Filed: Jan. 26, 2009

(86) PCT No.: PCT/SE2009/050074
§ 371 (c)(1),
(2), (4) Date: Sep. 1, 2010

(87) PCT Pub. No.: WO2009/096885
PCT Pub. Date: Aug. 6, 2009

(65) Prior Publication Data
US 2011/0000461 A1  Jan. 6, 2011

(30) Foreign Application Priority Data
Feb. 1, 2008 (SE) ........................ 0800252

(51) Int. Cl.
*F02D 9/06* (2006.01)
*F02B 37/24* (2006.01)
*F02D 33/02* (2006.01)

(52) U.S. Cl.
USPC .......................... 123/323; 60/602

(58) Field of Classification Search
USPC .............. 123/323, 320, 559.1; 60/602, 605.1, 60/605.2, 624; 701/83
See application file for complete search history.

(56) References Cited

U.S. PATENT DOCUMENTS

| 6,102,146 A | 8/2000 | Schmidt et al. |
| 6,895,753 B2 * | 5/2005 | Larsson et al. ................... 60/624 |
| 7,010,918 B2 * | 3/2006 | Ruess .............................. 60/602 |

(Continued)

FOREIGN PATENT DOCUMENTS

| CN | 1526051 | 9/2004 |
| EP | 1 396 620 | 3/2004 |
| GB | 2342122 A | 4/2000 |
| GB | 2390642 A | 1/2004 |

OTHER PUBLICATIONS

Translation of Chinese Office Action issued in corresponding Chinese Patent Application No. 200980103637 (3 pages).

(Continued)

*Primary Examiner* — Hieu T Vo
(74) *Attorney, Agent, or Firm* — Ostrolenk Faber LLP

(57) ABSTRACT

An arrangement for exhaust braking of a combustion engine (2) which is equipped with a turbo unit with at least one flow element in the form of a vane or rail (17, 27) settable in varying positions to control the flow of exhaust gases through the turbine (6). A bypass line (25) provided with an inlet aperture (25*a*) is connected to an exhaust passage (4*a*, 19, 20) at a location upstream of the flow element (17, 27). An outlet aperture (25*b*) is connected to the exhaust passage (21, 4*b*) at a location downstream of the flow element (17, 27). A throttle (26) in the bypass line. A control device (13, 18) places the flow element (17, 27) in a substantially closed position when an exhaust braking process is to be effected, so that a positive pressure occurs in the exhaust passage (4*a*, 19) at a location upstream of the flow element (17, 27), which positive pressure is defined by the throttle (26).

13 Claims, 3 Drawing Sheets

(56) References Cited

U.S. PATENT DOCUMENTS

| | | | |
|---|---|---|---|
| 7,051,527 B2 * | 5/2006 | Schmid et al. | 60/602 |
| 8,474,433 B2 * | 7/2013 | French | 123/323 |
| 2005/0144945 A1 | 7/2005 | Schmid et al. | |

OTHER PUBLICATIONS

International Search Report dated May 12, 2009, issued in corresponding international application No. PCT/SE2009/050074.

* cited by examiner

ARRANGEMENT FOR EXHAUST BRAKING OF A COMBUSTION ENGINE

CROSS REFERENCE TO RELATED APPLICATION

The present application is a 35 U.S.C. §§371 national phase conversion of PCT/SE2009/050074 filed Jan. 26, 2009, which claims priority of Swedish Application No. 0800252-9, filed Feb. 1, 2008, the disclosure of which is incorporated by reference herein. The International Application was published in the English Language

BACKGROUND TO THE INVENTION, AND STATE OF THE ART

The present invention relates to an arrangement for exhaust braking of a combustion engine by controlling passage of engine exhaust gases through the turbo for creating a back pressure in the exhaust passage.

Conventional exhaust brakes comprise in many cases a substantially disc-like damper arranged for pivoting within an exhaust line of a combustion engine. When the exhaust brake is activated, the damper is pivoted to a position in which it totally or partly blocks the flow of gases through the exhaust line. A resistance to the upward movement of the combustion engine's pistons during the combustion engine's exhaust phase is thus created, resulting in a braking effect. When the exhaust brake is not activated, the disc-like damper is pivoted to a position such that the exhaust gases can flow past the damper with substantially no resistance. The damper is arranged in the exhaust line upstream or downstream of the turbo unit of supercharged combustion engines.

Conventional turbo units comprise a turbine which drives a compressor which compresses air which is led to a combustion engine. The turbo unit also comprises a bypass line and a valve device (wastegate) which has the function of limiting the turbo unit's charging pressure. When the turbo unit's charging pressure reaches a predetermined value, the valve device opens so that the exhaust gases in the exhaust line are led through the bypass line and flow past the turbo unit. The turbo unit thereupon slows down and the compressor's charging pressure decreases. A disadvantage of conventional turbo units is that at low engine speeds they have difficulty in providing a desired charging pressure.

Turbo units with variable geometry known as VTG (variable turbine geometry) have become increasingly commonly used, particularly in vehicles powered by diesel engines. Such turbo units comprise flow elements in the form of vanes or guide rails by which the exhaust flow towards a turbine can be varied. The guide rails may be pivotable or else a movable guide railing may be used. The turbine's capacity can thus be optimised at different engine speeds. Such a control also makes it possible to regulate the flow of charge air to the combustion engine and the amount of recirculating exhaust gases EGR (exhaust gas recirculation). A known practice is the use of pivotable guide rails and movable guide railings to create a counterpressure in the exhaust line upstream of the turbo unit with the object of effecting exhaust braking of a vehicle. This pressure is related to the braking action obtained during the exhaust braking. When exhaust braking is to be effected, the pivotable guide rails or the guide railing are placed in such a position that they totally or almost totally shut off the flow of gases to the turbine. A problem with such an exhaust brake is that it is difficult to create a counterpressure with good precision, since very small positional changes of the guide rails or the guide railing result in great variations in counterpressure.

SUMMARY OF THE INVENTION

The object of the present invention is to propose an arrangement which comprises a supercharged combustion engine equipped with a turbine which is of variable geometry, whereby a desired exhaust braking effect can be provided with very good precision by a simple regulating mechanism.

This object is achieved with the arrangement for exhaust braking of a combustion engine which is equipped with a turbo unit with at least one flow element in the form of a vane or rail settable in varying positions to control the flow of exhaust gases through the turbine. A bypass line provided with an inlet aperture is connected to an exhaust passage at a location upstream of the flow element. An outlet aperture is connected to the exhaust passage at a location downstream of the flow element and a throttle is in the bypass line. A control device places the flow element in a substantially closed position when an exhaust braking process is to be effected, causing a positive pressure occurs in the exhaust passage at a location upstream of the flow element, which positive pressure is defined by the throttle.

Flow element here means pivotable vanes or guide rails, a movable guide railing or some other kind of element arranged for movement, by which the flow of exhaust gases to a turbine can be regulated. A control unit initially places the flow element in a closed position when an exhaust braking process is to be effected. When the flow elements or guide rails are in the closed position, the gases from the combustion engine are prevented from flowing past the flow element in the exhaust passage. The gases in the exhaust passage upstream of the flow element can therefore only be led further in the exhaust passage via the bypass line when they are subjected to a flow resistance which is defined by a throttle means. When the flow element closes, the pressure in the exhaust passage upstream of the flow element increases quickly to a pressure level which is defined by the throttle means. The aforesaid bypass line and throttle means constitute a very simple regulating mechanism by which the pressure level, and hence the braking action which occurs during an exhaust braking process, can be determined with very good precision.

According to a preferred embodiment of the invention, the turbine is comprised in a turbo unit and the exhaust passage comprises a first exhaust line situated upstream of the turbo unit and a second exhaust line situated downstream of the turbo unit. The turbo unit takes with advantage the form of a composite unit enclosed in a housing. The turbo unit comprises with advantage a compressor driven by the turbine. The inlet aperture of the bypass line may be arranged in the first exhaust line situated upstream of the turbo unit. Alternatively, the inlet aperture of the bypass line may be arranged in a portion of the exhaust passage which is situated within the turbo unit. The outlet aperture of the bypass line may be arranged in the second exhaust line situated downstream of the turbo unit. Alternatively, the outlet aperture of the bypass line may be arranged in a portion of the exhaust passage which is situated within the turbo unit. The bypass line may thus take the form of an external pipeline which runs totally or partly past the turbo unit. The bypass line may also take the form of a short internal passage in the turbo unit.

According to another preferred embodiment of the invention, the throttle means is so constructed as to allow the maintenance of a constant positive pressure in the exhaust passage at said location upstream of the guide rails during an exhaust braking process. In this case the result is a braking action which is related to the value of the constant positive pressure throughout the exhaust braking process. The throttle means may in this case comprise a spring-loaded valve means. When the valve means is subjected to a pressure of a specified value, it opens against the action of said spring. Said spring causes the valve means to open and close in such a way that a constant positive pressure is maintained with good precision in the exhaust passage upstream of the closed flow element. The throttle means is alternatively so constructed as to allow the maintenance of a variable positive pressure in the exhaust passage at said location upstream of the guide rails during an exhaust braking process. In this case the result is a braking action but with different values during different braking situations. This braking action may also be varied in the course of an exhaust braking process. The arrangement comprises in this case with advantage a control unit adapted to controlling the throttle means. The control unit may receive information concerning various parameters relating to braking and may use this information to control the exhaust braking process in an optimum manner.

BRIEF DESCRIPTION OF THE DRAWINGS

Preferred embodiments of the invention are described below by way of examples with reference to the attached drawings, in which.

DETAILED DESCRIPTION OF PREFERRED EMBODIMENTS OF THE INVENTION

Figure 1:
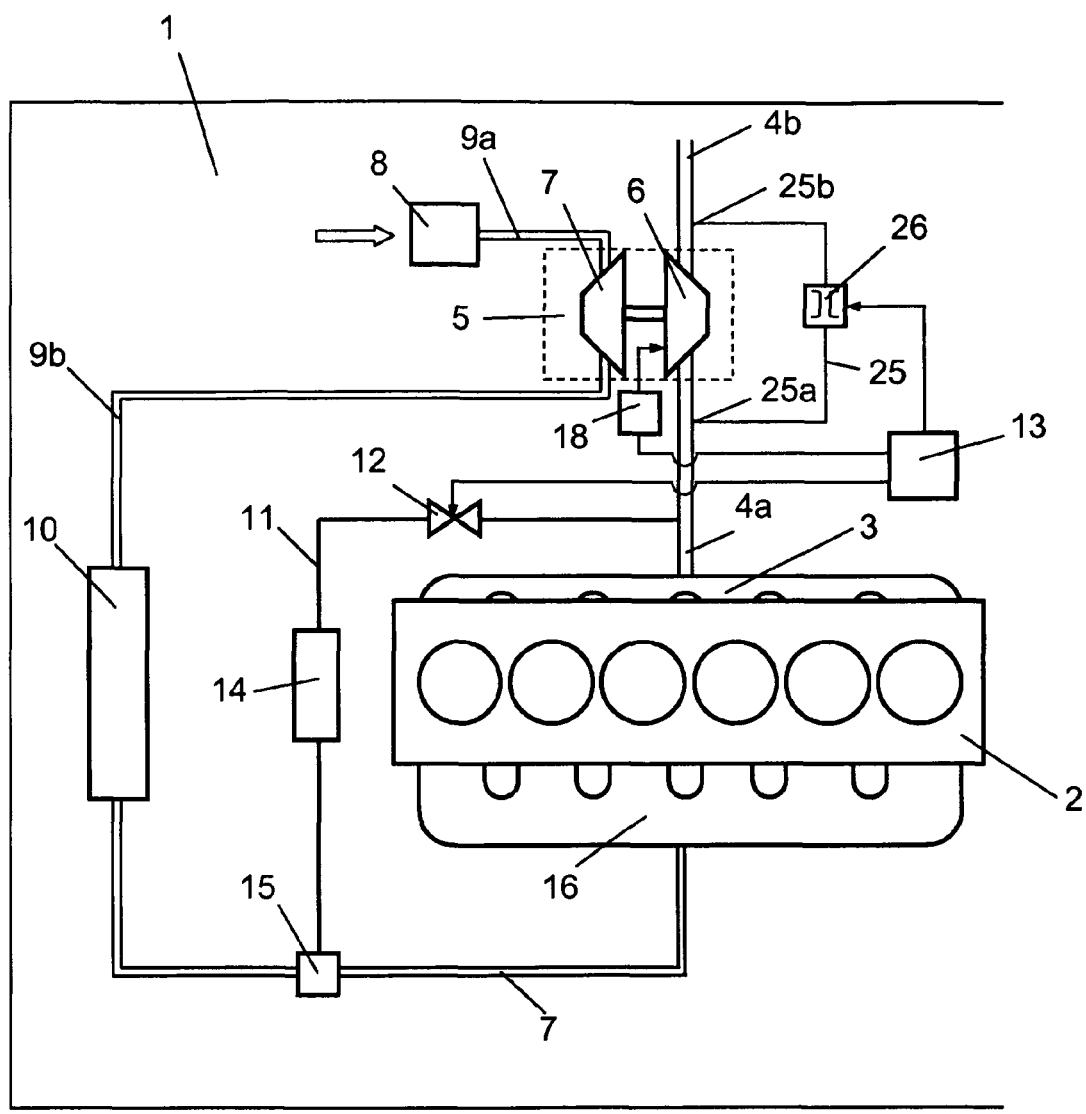
FIG. 1 depicts an arrangement which comprises a supercharged combustion engine with an exhaust brake according to the first embodiment of the invention.

FIG. 1 depicts schematically a vehicle 1 powered by a supercharged combustion engine 2. The combustion engine may be a diesel engine which powers a heavy vehicle. The exhaust gases from the cylinders of the combustion engine 2 are led via an exhaust manifold 3 to a first exhaust line 4a. The exhaust gases in the first exhaust line 4a, which are at above atmospheric pressure, are led to a turbo unit 5. The turbo unit 5 comprises a turbine 6 driven by the exhaust gases, and a compressor 7. When the exhaust gases have flowed through the turbine 6, they assume a lower pressure. The exhaust gases are led on in a second exhaust line 4b which may comprise undepicted exhaust treatment components. The turbine 6 provides driving power which is transmitted, via a connection, to the compressor 7. The compressor 7 draws surrounding air into a first airline 9a via an air filter 8. The air is compressed by the compressor 7 to above atmospheric pressure. A second airline 9b leads the compressed air to the combustion engine 2. After the compression, the air is at a relatively high temperature. A charge air cooler 10 is arranged in the second airline 9b to cool the compressed air before it is led to the combustion engine 2.

To recirculate part of the exhaust gases, a return line 11 is arranged between the first exhaust line 4a and the second airline 9b. Such recirculation is usually called EGR (exhaust gas recirculation). Adding exhaust gases to the compressed air which is led to the cylinders of the engine lowers the combustion temperature and hence also the content of nitrogen oxides (NOx) formed during the combustion processes of the combustion engine. The return line 11 comprises an EGR valve 12 by which it is possible to control the flow of exhaust gases through the return line 11. A control unit 13 is adapted to controlling the EGR valve 12 on the basis of information about the current operating state of the combustion engine 2 in such a way that a desired amount of exhaust gases is recirculated to the combustion engine 2. The control unit 13 may be a computer unit provided with software suitable for this purpose. The return line 11 comprises an EGR cooler 14 in which the exhaust gases are cooled. The return line 11 comprises finally a schematically depicted mixing device 15 which has the function of mixing the recirculating exhaust gases in the return line 11 with the air in the second airline 9b. The mixing device 15 is fitted close to a connection between the return line 11 and the second airline 9b. When the recirculating exhaust gases have mixed with the compressed air in the second airline 9b, the mixture is led via a manifold 16 to the respective cylinders of the combustion engine 2.

Figure 2:
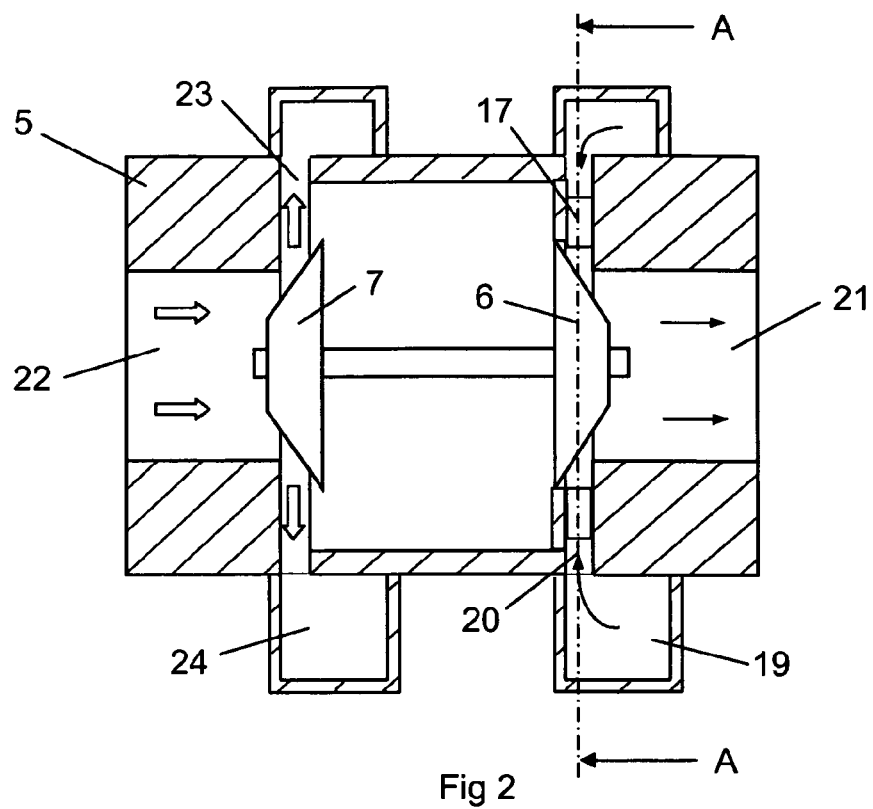
FIG. 2 depicts a sectional view of the turbo unit in FIG. 1.
Figure 3:
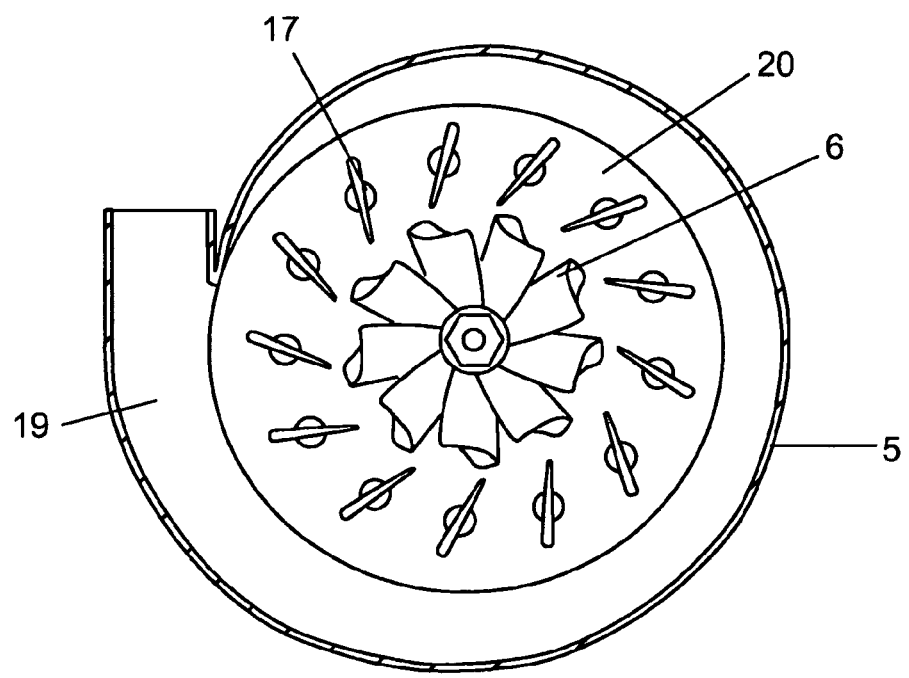
FIG. 3 depicts a sectional view in the plane A-A of the turbo unit in FIG. 2 when the exhaust brake is not activated.
Figure 4:
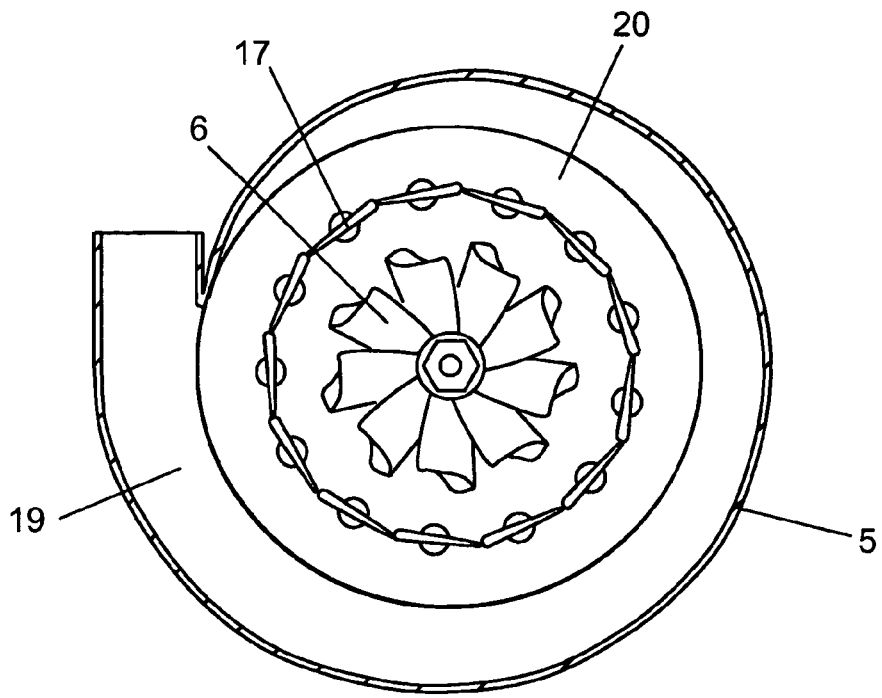
FIG. 4 depicts a sectional view in the plane A-A of the turbo unit in FIG. 2 when the exhaust brake is activated and FIG. 5 depicts a turbo unit with an exhaust brake according to a second embodiment of the invention.

This case involves the use of a turbo unit 5 of the kind which comprises a turbine 6 with variable geometry called VTG (variable turbine geometry). FIGS. 2-4 depict the turbo unit 5 in more detail. The turbo unit 5 comprises a flow element which is comprised of a plurality of aerodynamically shaped and pivotable vanes or guide rails 17 hereafter referred to as guide rails. The guide rails 17 are settable at various angles so that they can lead the exhaust flow towards the blades of the turbine 6 in various directions. To achieve optimum operation of the turbo unit 5, the guide rails 17 are placed at varying angles depending on the speed of the combustion engine 2. The guide rails 17 are settable at varying angles in a conventional manner by means of a schematically depicted operating element 18 which may be powered electrically, hydraulically or pneumatically. The control unit 13 is adapted to controlling the operating element 18 so that the guide rails 17 are substantially continuously set at an optimum angle during operation of the combustion engine 2. The advantage of turbo units 5 of this type is that they have little slippage and a low starting threshold, which means that they can be used at substantially lower engine speeds than conventional turbo units. Turbo units 5 of this type are also very efficient at high engine speed.

The turbo unit 5 comprises a spiral inlet passage 19 connected to the first exhaust line 4a. The spiral inlet passage 19 leads to a radial exhaust passage 20 in which the guide rails 17 are arranged. When the exhaust gases have been compressed in the turbine 6, they are led out from the turbo unit 5 to the second exhaust line 4b via an outlet passage 21. The turbo unit 5 comprises an inlet passage 22 for receiving air from the first airline 9a. When the air has been compressed in the compressor 7, it is led radially outwards in a radial air passage 23. The radial air passage 23 leads to a spiral outlet passage 24 connected to the second airline 9b. A bypass line 25 has an inlet aperture 25a connected to the first exhaust line 4a, and an outlet aperture 25b connected to the second exhaust line 4b. The bypass line 25 comprises an adjustable throttle means 26 by which the flow resistance in the bypass line 25 can be adjusted. The control unit 13 is adapted to controlling the throttle means 26.

During operation of the combustion engine 2, the control unit 13 receives information about the speed of the combustion engine 2. The control unit 13 thereupon activates the operating elements 18 so that they continuously set the guide rails 17 at an optimum angle for the prevailing engine speed. FIG. 3 depicts the guide rails 17 in an angled position when the combustion engine 2 is running at a relatively high speed.

The guide rails 17 are here in a substantially fully open position so that optimally wide exhaust passages are formed between adjacent guide rails 17 while at the same time the exhaust gases are led in an almost radial direction towards the turbine 6. The control unit 13 may also control the EGR valve 12 and regulate the amount of exhaust gases which is returned to the combustion engine 2 via the return line 11. By controlling the guide rails 17, the control unit 13 can also regulate the pressure in the first portion 4a of the exhaust line. The control unit 13 is thus provided with a further control facility for regulating the amount of exhaust gases which is recirculated in the return line 11. The control unit 13 is normally adapted to placing the throttle means 26 in the bypass line 25 in a closed position during normal operation of the combustion engine 2.

If the control unit 13 receives information which indicates that a driver of the vehicle 1 has released the accelerator pedal and depressed the brake pedal while the vehicle is travelling forwards, the control unit 13 initiates activation of an exhaust braking process of the vehicle. The control unit 13 thereupon activates the operating elements 18 to place the guide rails 17 in a fully closed position depicted in FIG. 4. In this position, substantially no gases can be led past the guide rails 17. All the gases leaving the combustion engine 2 have then to pass through the bypass line 25 to reach the second exhaust line 4b. The bypass line 25 here leads the gases from the first exhaust line 4a to the second exhaust line 4b. The bypass line 25 thus leads the gases past the whole turbo unit 5. The control unit 13 is adapted to placing the throttle means 26 in a position such that a suitable positive pressure is created in the first exhaust line 4a, thereby counteracting the upward movement of the pistons of the combustion engine 2 during the exhaust phase of the combustion engine 2. This counterpressure created in the first exhaust line 4a upstream of the guide rails 17 is related to the braking action obtained during the exhaust braking process. The control unit 13 can regulate the throttle means 26 to cause throttling of a desired value which is constant or variable during the course of the exhaust braking process, and hence a corresponding braking action. By means of a bypass line 25 and a throttle means 26 a very simple regulating mechanism can be achieved by which the pressure level, and hence the braking action are obtained during an exhaust braking process, can be determined with very good precision.

Figure 5:
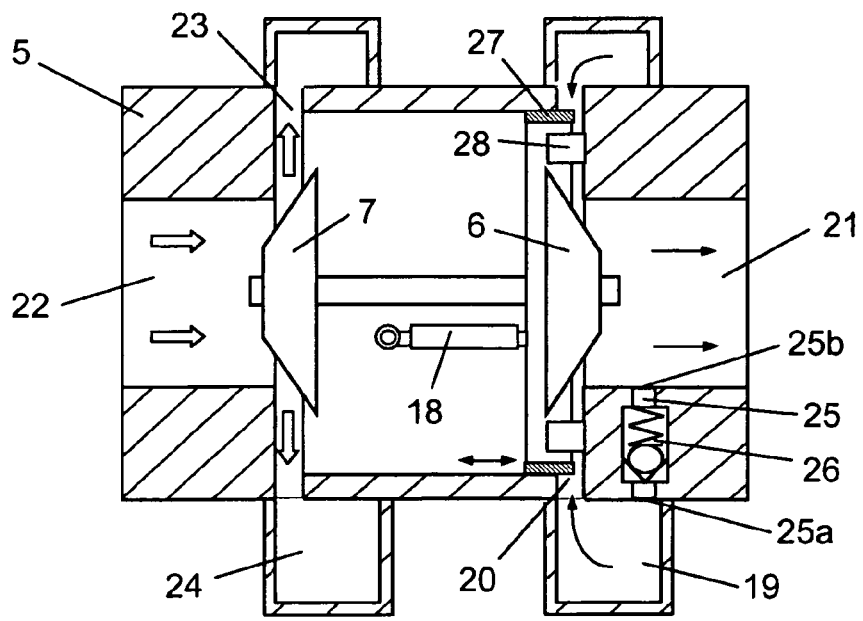

FIG. 5 depicts an alternative configuration of the bypass line 25. In this case the bypass line 25 is situated within the turbo unit 5. The bypass line 25 comprises here an inlet aperture 25a connected to the turbo unit's spiral inlet passage 19, and an outlet passage 25b connected to the turbo unit's outlet passage 21. As the outlet duct 21 is situated radially internal to the spiral inlet duct 19, the bypass line 25 may be of very short extent. The bypass line 25 comprises in this case a throttle means in the form of a spring-loaded valve means 26 adapted to opening when a predetermined pressure difference occurs between the exhaust gases in the turbo unit's spiral inlet passage 19 and outlet passage 21. In this case a movable guide railing 27 by which the width of the radial exhaust passage 20 and hence the flow of exhaust gases through the passage 20 can be varied is arranged in the passage. Fixed guide rails 28 are arranged at a position radially internal to the guide railing 27 to direct the exhaust flow towards the turbine 6.

When the control unit 13 receives information which indicates that an exhaust braking process of the vehicle 1 is to be effected, the control unit 13 activates the operating element 18 which shifts the guide railing 27 to a closed position. The gases from the combustion engine 2 which are successively supplied to the first exhaust line 4a and in the turbo unit 5 upstream of the guide railing 27 cause the pressure difference acting upon the spring-loaded valve means 26 to rise quickly to a value at which the spring-loaded valve means 26 opens. The spring-loaded valve means 26 is thereafter subject to a constant pressure in the exhaust passage upstream of the guide railing 27. In this case the result is a corresponding braking action with very good precision throughout the exhaust braking process.

The present invention is not limited to the embodiments depicted in the drawings but may be varied freely within the scopes of the claims.

The invention claimed is:

1. An apparatus for exhaust braking of a combustion engine comprising:
    an exhaust passage located and configured for receiving and leading exhaust gases from the combustion engine,
    a turbine in the exhaust passage located and configured to be operated by exhaust gases flowing past the turbine,
    at least one flow element located and configured and settable in varying positions to control a flow of exhaust gases through the turbine
    a control device configured to control the flow element to vary the flow of exhaust gases through the turbine,
    a bypass having an inlet connected to the exhaust passage at a location upstream of the flow element with respect to the intended direction of exhaust gas flow in the exhaust passage, an outlet connected to the exhaust passage at a location downstream of the flow element and an exhaust gas pressure responsive throttle in the bypass,
    the control device being operable to place the flow element in a substantially closed position reducing exhaust gas flow to the turbine when an exhaust braking process of the engine is to be effected, for causing a positive pressure in the exhaust passage at a location upstream of the flow element and the throttle is configured to define the positive pressure.

2. An arrangement according to claim 1, further comprising a turbo unit in which the turbine is disposed, and the exhaust passage comprises a first exhaust line situated upstream of the turbo unit and a second exhaust line situated downstream of the turbo unit.

3. An arrangement according to claim 2, wherein the inlet of the bypass line is in the first exhaust line upstream of the turbo unit.

4. An arrangement according to claim 3, wherein the outlet of the bypass line is in the second exhaust line and downstream of the turbo unit.

5. An arrangement according to claim 3, wherein the outlet of the bypass line is in the second exhaust line and downstream of the turbo unit.

6. An arrangement according to claim 3, wherein the outlet of the bypass line is in a portion of the exhaust passage within the turbo unit.

7. An arrangement according to claim 2, wherein the inlet of the bypass line is in a portion of the exhaust passage within the turbo unit.

8. An arrangement according to claim 7, wherein the outlet of the bypass line is in a portion of the exhaust passage within the turbo unit.

9. An arrangement according to claim 8, wherein the flow element comprises a plurality of flow guides in the turbo unit positioned for moving between a position blocking flow of exhaust gases through the turbo to the outlet passage and a position permitting the flow and positions between the blocking and flow permitting positions.

10. An arrangement according to claim 1, wherein the throttle is configured to selectively maintain a constant positive pressure in the exhaust passage upstream of the flow element during an exhaust braking process.

11. An arrangement according to claim 10, wherein the throttle comprises a spring-loaded valve.

12. An arrangement according to claim 7, wherein the control device comprises a control unit configured to control the throttle.

13. An arrangement according to claim 1, wherein the throttle is configured to selectively maintain a variable positive pressure in the exhaust passage upstream of the flow element during an exhaust braking process.

* * * * *

UNITED STATES PATENT AND TRADEMARK OFFICE
CERTIFICATE OF CORRECTION

PATENT NO. : 8,646,433 B2  
APPLICATION NO. : 12/865146  
DATED : February 11, 2014  
INVENTOR(S) : Fransson et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 864 days.

Signed and Sealed this

Twenty-ninth Day of September, 2015

Michelle K. Lee
*Director of the United States Patent and Trademark Office*